(12) United States Patent
Gavalas

(10) Patent No.: US 8,343,403 B2
(45) Date of Patent: Jan. 1, 2013

(54) METHOD FOR MAKING A MICROPOROUS MEMBRANE

(75) Inventor: Lillian Susan Gavalas, League City, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 898 days.

(21) Appl. No.: 12/174,380

(22) Filed: Jul. 16, 2008

(65) Prior Publication Data

US 2010/0015355 A1 Jan. 21, 2010

(51) Int. Cl.
*B32B 3/26* (2006.01)
(52) U.S. Cl. .................................................. 264/135
(58) Field of Classification Search ............ 264/135
See application file for complete search history.

(56) References Cited

U.S. PATENT DOCUMENTS

| | | | |
|---|---|---|---|
| 5,779,891 A | 7/1998 | Andelman | |
| 6,630,073 B1 | 10/2003 | Moskal et al. | |
| 6,680,044 B1 | 1/2004 | Tonkovich et al. | |
| 6,719,147 B2 | 4/2004 | Strano et al. | |
| 7,008,563 B2 | 3/2006 | Smalley et al. | |
| 7,011,760 B2 | 3/2006 | Wang et al. | |
| 7,175,762 B1 | 2/2007 | Noca et al. | |
| 7,264,876 B2 | 9/2007 | Smalley et al. | |
| 2002/0068170 A1* | 6/2002 | Smalley et al. ............ | 428/403 |
| 2004/0007528 A1 | 1/2004 | Bakajin et al. | |
| 2004/0173506 A1 | 9/2004 | Doktycz et al. | |
| 2004/0211589 A1* | 10/2004 | Chou et al. ............... | 174/253 |
| 2005/0067346 A1 | 3/2005 | Noack et al. | |
| 2005/0252857 A1 | 11/2005 | Wilson et al. | |
| 2005/0263453 A1 | 12/2005 | Collias et al. | |
| 2005/0263456 A1 | 12/2005 | Cooper et al. | |
| 2005/0279696 A1 | 12/2005 | Bahm et al. | |
| 2006/0027499 A1 | 2/2006 | Ajayan et al. | |
| 2006/0163160 A1 | 7/2006 | Weiner et al. | |
| 2010/0206811 A1* | 8/2010 | Ng et al. ................. | 210/654 |

OTHER PUBLICATIONS

David S. Sholl and J. Karl Johnson, "Making High-Flux Membranes with Carbon Nanotubes" Science, vol. 312, May 19, 2006, pp. 1003-1004.
Jason K. Holt et al., "Fast Mass Transport Through Sub-2-Nanometer Carbon Nanotubes," Science, vol. 312, May 19, 2006, pp. 1034-1037.
William H. Noon et al., "Helical Ice-Sheets Inside Carbon Nanotubes in the Physiological Condition," Chemical Physics Letters 355 (2002) 445-448.

(Continued)

*Primary Examiner* — Larry Thrower
(74) *Attorney, Agent, or Firm* — Kurt G. Hammerle

(57) ABSTRACT

A method for making a microporous membrane comprises the steps of: providing a plurality of carbon nanotubes having a hollow interior diameter of 20 Angstroms or less; sonicating the plurality of carbon nanotubes utilizing a solution comprising deionized, distilled water and a surfactant that coats at least one of the plurality of carbon nanotubes; collecting the coated carbon nanotubes; forming a matrix that supports the plurality of carbon nanotubes; embedding the coated carbon nanotubes into the matrix; rinsing the coated nanotubes to remove at least a portion of the surfactant; curing the nanotube-matrix assembly; and cutting the nanotube-matrix assembly to a particular thickness so as to open the ends of the embedded nanotubes. The hollow interiors of the plurality of embedded carbon nanotubes comprise the pores of the microporous membrane.

18 Claims, 1 Drawing Sheet

OTHER PUBLICATIONS

G. Reiter of al., "Water in Carbon Nanotubes Is Not the Same Old Stuff," May 16, 2006, pp. 1-10, available on line on Jul. 1, 2008 at: http://arxiv.org/PS_cache/cond-mat/pdf/0601/0601072v1.pdf.

Lawrence Livermore National Laboratory News Release entitled "Nanotube Membranes Offer Possibility of Cheaper Desalination", May 18, 2006, NR-06-05-06, 3 pages, available on line on Jul. 1, 2008 at: https://publicaffairs.llnl.gov/news/news_releases/2006/NR-06-05-06.html.

L. Huang et al., "Self-Organizing High-Density Single-Walled Carbon Nanotube Arrays From Surfactant Suspensions", Nanotechnology 15 (2004), pp. 1450-1454.

M. J. O'Connell et al., "Reversible water-solubilization of single-walled carbon nanotubes by polymer wrapping" Chemical Physics Letters 342 (2001), pp. 265-271.

* cited by examiner

METHOD FOR MAKING A MICROPOROUS MEMBRANE

ORIGIN OF THE INVENTION

The invention described herein was made by an employee or employees of the United States Government and may be manufactured and used by or for the Government of the United States of America for governmental purposes without the payment of any royalties thereon or therefor.

CROSS REFERENCE OF RELATED APPLICATION

This application is related to U.S. patent application Ser. No. 12/167,332, entitled "Filtering Apparatus and Method of Use" filed on Jul. 3, 2008.

FIELD OF INVENTION

The field of invention relates generally to a method for constructing a microporous membrane used for filtration of fluids. More particularly, the field of invention relates to a method for making a microporous membrane using carbon nanotubes.

BACKGROUND OF INVENTION

Separation of substances such as fluids into their constituent parts is of particular interest for many industrial processes. Traditional separation methods for fluids include distillation and absorption. Another approach toward separation of substances comprises the use of a membrane, which may be quite cost and energy effective as compared to other traditional methods. An ideal membrane would have excellent stability under a variety of processing conditions, would have high selectivity for the constituent parts of interest, and would have a high molecular through-put or "flux" with a conversely small driving force. Materials with high flux tend to also have low selectivity, and vice versa. Thus, new materials and processes for fabrication of a membrane that can overcome these fundamental hurdles could drastically reduce the energy consumed in present-day operations toward separation of substances. As the long-felt need for development of a more efficient, low power separation or filtration system or apparatus capable of use at remote locations continues, new technologies are being examined and applied.

SUMMARY OF THE INVENTION

In one embodiment, a method for making a microporous membrane is described. The method comprises the steps of: providing a plurality of carbon nanotubes having a hollow interior with a diameter of 20 Angstroms or less; sonicating the plurality of carbon nanotubes utilizing a solution comprising deionized, distilled water and a surfactant that coats at least one of the plurality of carbon nanotubes; collecting the coated carbon nanotubes; embedding the coated carbon nanotubes into a matrix; curing the nanotube-matrix assembly; and cutting the nanotube-matrix assembly to a particular thickness so as to open both ends of the embedded nanotubes, wherein the hollow interior of the carbon nanotubes comprises the pores of the microporous membrane.

In another embodiment, a method for making a microporous membrane comprises the steps of: providing a plurality of carbon nanotubes having a hollow interior with a diameter of 20 Angstroms or less; sonicating the plurality of carbon nanotubes utilizing a solution comprising deionized, distilled water and a surfactant that coats at least one of the plurality of carbon nanotubes; collecting the coated carbon nanotubes; rinsing the coated nanotubes to remove at least a portion of the surfactant; embedding the partially coated carbon nanotubes into a matrix; curing the nanotube-matrix assembly; and cutting the nanotube-matrix assembly to a particular thickness so as to open both ends of the embedded nanotubes, wherein the hollow interior of the carbon nanotubes comprises the pores of the microporous membrane.

In another embodiment, a method for making a microporous membrane comprises the steps of: providing a plurality of carbon nanotubes having a hollow interior with a diameter of 20 Angstroms or less; sonicating the plurality of carbon nanotubes utilizing a solution comprising deionized, distilled water and a surfactant that coats at least one of the plurality of carbon nanotubes; collecting the coated carbon nanotubes by evaporating the solution; forming a matrix that supports the plurality of carbon nanotubes; embedding the partially coated carbon nanotubes into the matrix; curing the nanotube-matrix assembly; rinsing the coated nanotubes to remove at least a portion of the surfactant; and cutting the nanotube-matrix assembly to a particular thickness so as to open both ends of the embedded nanotubes, wherein the hollow interior of the carbon nanotubes comprises the pores of the microporous membrane.

Other aspects and advantages of the embodiments described herein will become apparent from the following description and appended claims, taken in conjunction with the accompanying drawings, illustrating the principles of the embodiments by way of example only.

DETAILED DESCRIPTION OF EXEMPLARY EMBODIMENTS

Figure 1:
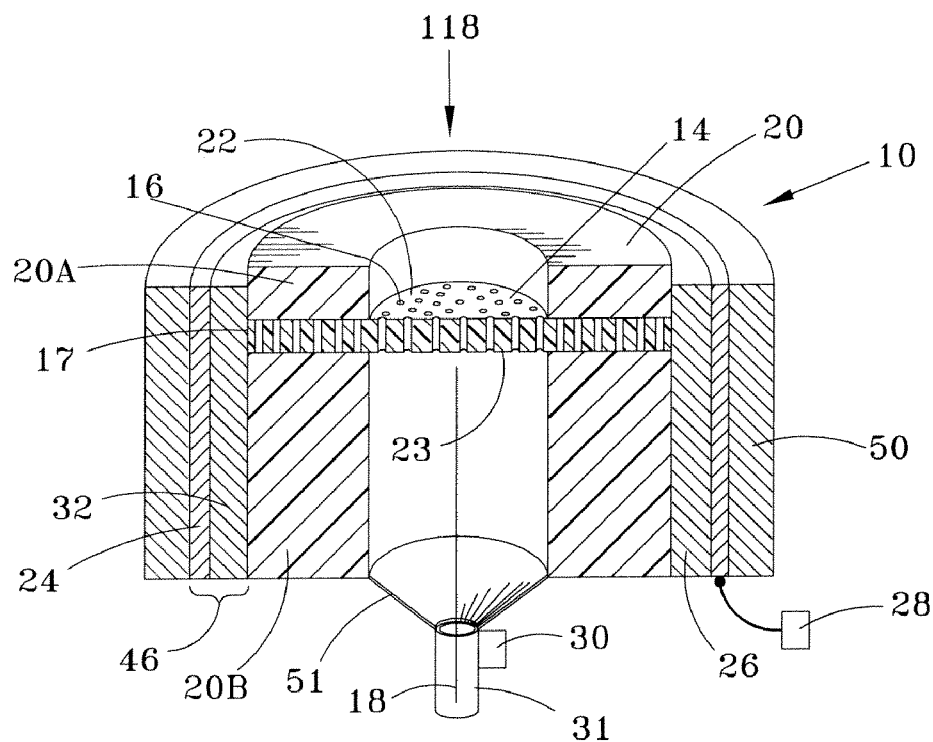
FIG. 1 is a cross-sectional perspective view of a filtering apparatus including an embodiment of a microporous membrane.

Exemplary embodiments will now be described with reference to the accompanying drawings or figures. Throughout the drawings, like elements or components are denoted with the same reference characters for consistency.

Before beginning a detailed description of some exemplary embodiments, the meaning of certain terms as used herein will be given.

"Macroporous" means having or containing pores with diameters greater than about 50 nm, or about 500 Angstrom.

"Mesoporous", such as a "mesoporous material", means a material containing pores with diameters ranging between about 2 and about 50 nanometers, or about 20 to about 500 Angstrom.

"Microporous" means having or containing pores with diameters of less than about 2 nm or about 20 Angstrom.

A filtering apparatus in accordance with the exemplary embodiments of the invention comprises an acoustically driven molecular sieve which filters substances such as a fluid by passing through molecules of a particular size or smaller while collecting larger molecules, such as biological contaminants. The filtered substance passes through the pores of a microporous membrane. In one embodiment, the pores of the membrane comprise the substantially hollow interiors of a plurality of carbon nanotubes. The filtering apparatus further comprises an actuator which propagates an acoustic vibration onto the membrane and the substance being filtered at or near a particular frequency determined beforehand to be of interest. The acoustic vibration hastens movement of the molecules through the pores of the microporous membrane. The filtering apparatus may be used to purify wastewater for reuse aboard spacecraft or other non-earth based structures, but it also has various applications on earth suitable for generating potable, medical grade, or otherwise purified water from contaminated water supplies. The filtering apparatus may also be used to remove water from chemical compounds, such as removing water from alcohols. While the accompanying drawings may display only a single filtering apparatus, a filtering apparatus in accordance with the exemplary embodiments may be scalable to larger diameters and power levels, and to multiple assemblies of the filtering apparatus.

Referring now to FIG. 1, a filtering apparatus 10 comprises a microporous membrane 14, represented as a disk in the embodiment of FIG. 1, operatively positioned to traverse across the path of movement of a substance or of flow of a fluid positioned in a hollow interior of a conduit 20 or a housing 50. Both conduit 20 and housing 50 have a hollow interior for the transport or placement in bulk of a fluid or substance. While shown in FIG. 1 as essentially a pipe, tube, hose, or cylindrical structure having a circular cross-section for its hollow interior, conduit 20 and housing 50 may comprise structures having other cross-sectional shapes for the hollow interior, such as, for example, elliptical, rectangular, triangular, trapezoidal, pentagonal, hectagonal, octagonal, or other shapes. Operatively positioned near the microporous membrane 14 is an actuator 26 for propagating acoustic vibration to the membrane 14. Housing 50 may also serve to cover and protect actuator 26 and microporous membrane 14.

The membrane 14 of FIG. 1 has a circular cross-section with a representative diameter of about 4 millimeters (mm) and a thickness between about 1 and about 40 microns (mu or "$\mu$", i.e., $1.0 \times 10^{-6}$ meters) thick. Within the microporous membrane 14 are a plurality of pores 16, a majority of which are each substantially aligned along an axis 18. Axis 18 corresponds with the directional flow or movement of molecules (represented by vector 118) when they are sifted through the membrane 14. In the embodiment of FIG. 1, axis 18 also represents the axis of the membrane 14 when it is in the shape of a disk. The aligned pores 16 are embedded in membrane 14 so as to provide a passage for molecules through the membrane 14. Filtering apparatus 10 performs its filtering function at least in part by sifting molecules of interest that are of a certain size or smaller as they fit into and pass through the pores 16, whereas larger-sized molecules cannot. The substance or fluid to be purified or separated may be travelling in bulk through the interior of the conduit 20 in the principal direction represented by vector 118.

The pores 16 in one exemplary embodiment comprise a plurality of carbon nanotubes, such as for example single-walled carbon nanotubes (SWNT), with at least a majority of the plurality of carbon nanotubes being open-ended once assembled in the membrane 14 and having a substantially hollow interior passage of particular dimension. Carbon nanotubes are generally hydrophobic; therefore, the dynamical and structural properties of water located within the hollow interior of a carbon nanotube of two nanometers or less in diameter are expected to differ greatly from those of bulk water. For instance, as described with greater detail in the publication by William H. Noon et al. entitled "Helical Ice-Sheets Inside Carbon Nanotubes in the Physiological Condition," Chemical Physics Letters 355 (2002) 445-448, the behavior of water inside a segment of a SWNT depends, at least in part, on the size of the interior diameter of the nanotube. Noon et al make their conclusions from computer-based simulations known as molecular dynamics (MD), in particular simulations of segments of pristine SWNT of different sizes submerged in a periodic hexagonal prism of water in the physiological condition (300° K and 1 atm). Noon et al. report that the size of a nanotube 6.75 Angstroms in diameter is too small to accommodate any water molecules inside, and that the behavior of water molecules inside a carbon nanotube of 20.26 Angstoms in diameter is the same as that of bulk water. However, Noon et al. conclude that the behavior of water molecules inside nanotubes of sizes intermediate these values in diameter is significantly different.

Specifically, simulations of a nanotube having an interior diameter of 8.11 Angstroms indicate the nanotube can accommodate a hydrogen-bonded single-file water network. Likewise, simulations of a nanotube having an interior diameter of 9.46 Angstroms indicate the nanotube can accommodate a hydrogen-bonded three-column water network, simulations of a nanotube having an interior diameter of 10.81 Angstroms indicate the nanotube can accommodate a four-column water network, and simulations of a nanotube having an interior diameter of 13.51 Angstroms indicate the nanotube can accommodate a seven-column water network. Based on the oxygen-oxygen radial distribution functions of water molecules, the water molecules tend to stay about 3 Angstroms away from the interior wall of the nanotube. Thus, computational simulations (and experimental evidence) have shown that water molecules, sifted inside a carbon nanotube having its interior diameter within a particular range above about 5 Angstroms to about 20 Angstroms become aligned into helical columns that exhibit properties of both excitable ice crystals and liquid water.

Accordingly, in yet another embodiment, at least a majority of the open-ended carbon nanotubes of the filtering apparatus 10 have a substantially hollow interior with a diameter ranging from about 5 to about 20 Angstroms, or more particularly from about 8.1 to about 13.5 Angstroms. In this particular embodiment, because the surface tension of water is low enough, water molecules are able to enter and travel within the hollow interior of the nanotube. The resulting movement or flow of the molecules is induced in part by polarity of the molecules.

The actuator 26 is capable of performing the function of propagating acoustic vibration onto the membrane 14 and the molecules being sifted therethrough at or near a particular frequency, such as the libration frequency of ice when the molecules are water, so as to hasten movement of the molecules through the pores 16. The actuator 26 may comprise a transducing subassembly 46 that converts an electrical energy input into mechanical energy output such as acoustic vibration. Once constructed, the transducing subassembly has an acoustic impedance that is substantially similar to the acoustic impedance of the microporous membrane. In one embodiment, actuator 26 comprises the transducing subassembly 46 of a transducing material 32 and an electrode 24. For example, the transducing material 32 may comprise at least one layer of a polyvinyledene fluoride (PVDF) film that is approximately 9 microns ($\mu$) thick. Alternately, the transducing material 32 may comprise an electroactive material like lead zirconate titanate (PZT), such as when the impermeable material 15 comprises a ceramic material so that the acoustic impedance of the membrane 14 and the transducing material 32 are substantially matched. The electrode 24 may comprise a copper film that is approximately 150 nanometers thick and that coats the transducing material 32.

The actuator 26 is operatively positioned near the membrane 14. In the embodiment of FIG. 1, the actuator 26 is positioned on at least a portion of the outer perimeter 17 of membrane 14 or the outer exterior surface of conduit 20. In one embodiment, the transducing subassembly 46 is affixed in this position by an electrically non-conductive epoxy. The actuator 26 may further comprise an oscillator 28 capable of providing an electrical energy output by being tunable to operate within a frequency range from about 50 to about 200 MHz, or from about 50 MHz to about 20 GHz. This frequency output may be adjusted (automatically) to enhance efficiency. For instance, a flow sensor 30 may be positioned near the exit 51 of the conduit 20 (or housing 50). The flow sensor 30 may be used to notify a controller (not shown) when the rate of flow slows to a specified value, prompting the controller to initiate the actuator 26 to propagate acoustic vibrations onto the microporous membrane and re-establish flow. Other transducing subassemblies may be used for operation above 20 GHz and at other vibrational modes.

Figure 3:
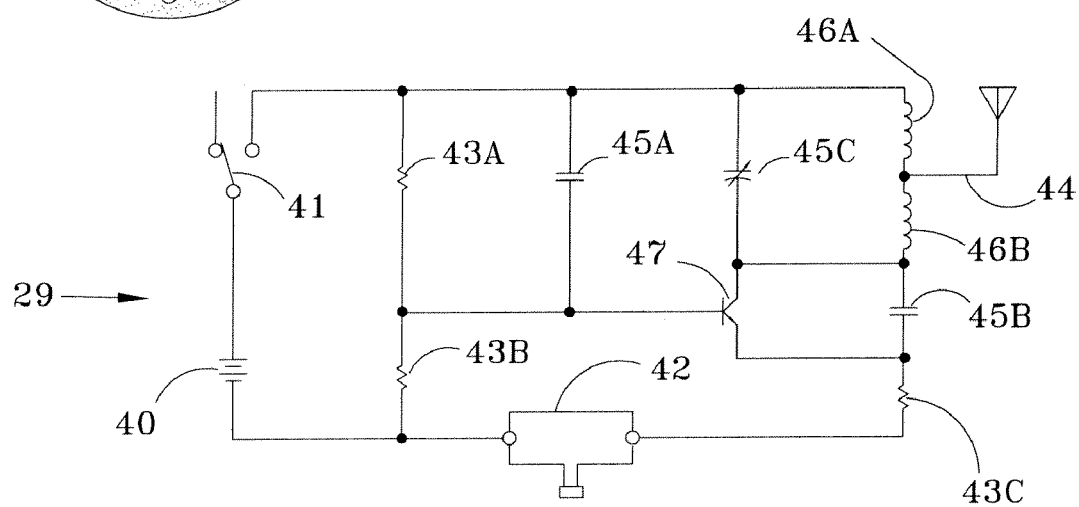
FIG. 3 is an oscillator circuit incorporated by an actuator for a filtering apparatus for use of an embodiment of the present invention.

Referring now to FIG. 3, oscillator 28 comprises in one embodiment an oscillating circuit 29. The oscillating circuit 29 provides the function of a tunable, oscillating electrical energy output for the oscillator 28. The oscillating circuit 29 includes a source 40 of electrical energy, a jumper 42, and an antenna lead 44. In one embodiment, the antenna lead 44 is operatively connected to the actuator 26 by bonding electrical wire from the antenna lead 44 directly to the electrode 24. The circuit 29 further comprises a switch 41, three resistors 43a, 43b, and 43c, two capacitors 45a, 45b, and a dialable capacitor 45c. The circuit 29 further comprises two inductors 46a and 46b and a transistor 47. The dialable capacitor 45c enables the circuit 29 to be operable at a variety of frequencies. In one embodiment, source 40 comprises a 9-volt battery, but other sources of electric energy, such as a household power line, an industrial power line, or a photovoltaic cell that converts solar energy into electric energy may also be used. Transistor 47 may comprise the NPN-type bipolar junction type transistor known as 2N3904 and sold commercially by the manufacturer Fairchild Semiconductor. Similarly, oscillating circuit 29 may comprise other electrical components in another arrangement than what is represented in FIG. 3 but apparent to the skilled artisan now having the benefit of this description.

Figure 2:
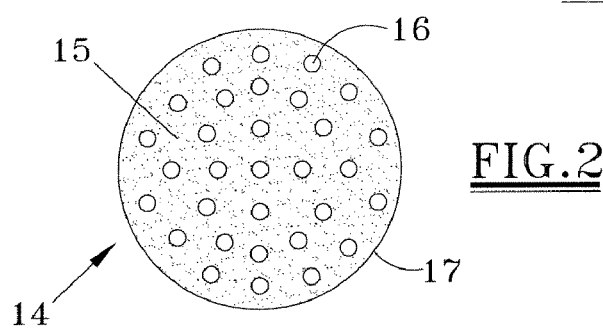
FIG. 2 is a top view of a microporous membrane in the shape of a disk in accordance with an embodiment of the invention.

Referring now to FIG. 2, a top view is shown of the microporous membrane 14 in the shape of a disk, as it was in FIG. 1. While the membrane 14 is shown with a circular cross-section, the membrane 14 may comprise other shapes in cross-section, including elliptical, triangular, rectangular, trapezoidal, pentagonal, octagonal, or other shapes. As shown in FIG. 2, the microporous membrane 14 may further comprise a matrix 15 for supporting the plurality of carbon nanotubes embedded therein. The matrix 15 is made of a material that is impermeable to the molecules of the substance or fluid being sifted by membrane 14, such that only the open-ended carbon nanotubes permit movement of the molecules through the microporous membrane 14. As will be discussed in further detail below, the impermeable material of matrix 15 may also be hydrophobic and may comprise a thermoplastic polymer such as a polyvinyl chloride resin combined with a calcium carbonate of nanoscale grain size. The impermeable material may further comprise a plasticizer. In another embodiment, the impermeable material of the matrix comprises a clay with one or more of gold and silver contained therein.

Operation of the filtering apparatus 10 enables the process of the filtering a substance or fluid. In one embodiment, the process or method of filtering comprises the steps of: (a) sifting molecules of the substance or fluid through the microporous membrane and, (b) propagating acoustic vibration onto the microporous membrane and the molecules at a particular frequency so as to hasten movement of said molecules through the membrane. The step of propagating acoustic vibration is performed at a particular frequency ranging from about 50 to about 200 MHz, or from about 50 MHz to about 20 GHz. In another embodiment, a method of filtering water comprises the steps of: (a) sifting molecules of the water through a microporous membrane, the pores of the microporous membrane comprising a plurality of carbon nanotubes and (b) propagating acoustic vibration onto the microporous membrane at a libration frequency of ice so as to hasten movement of the molecules of water through the carbon nanotubes. For this method of filtering water, at least a majority of the carbon nanotubes each have a substantially hollow interior with a diameter ranging from about 8 Angstroms to about 14 Angstroms.

Operation of the filtering apparatus 10 begins by positioning a substance or fluid to be filtered, such as dirty water or a mix of alcohol and water, within the hollow interior of the conduit 20 or the housing 50 such that the substance or fluid is in contact with an upper face 22 of the membrane 14. A container 31 may be placed on the exit side of the membrane to collect the substance or fluid after it is sifted through the membrane. The actuator 26 is then activated, such as by switching on the power source 40 of oscillating circuit 29. The resulting acoustic vibration that is propagated forms acoustic waves that are coupled via the membrane 14 onto the pores 16 and the adjacent molecules of the fluid or substance.

For water, the mechanical energy transferred from the acoustic waves to the molecules as they enter and pass-through the nanotubes of the membrane may exceed the specific heat of fusion of ice. About 0.7 microvolts is the minimum amount of energy required for a change of state of one molecule of water. Energy levels at or above this amount are sufficient to cause the water molecules to become detached from one another, thereby behaving more like water in its liquid state, even though Noon et al. report that water molecules tend to organize themselves into a highly hydrogen-bonded network (i.e., solid-like wrapped-around ice sheets) as they are inside a carbon nanotube. The acoustic excitation, such as at the libration frequency of ice, enables water to flow more freely, or in other words, hasten its movement, along the hollow interior of the nanotubes and exit the membrane 14 on a lower face 23.

An example of a process of manufacturing a microporous membrane 14 in accordance with one embodiment comprising a plurality of carbon nanotubes as the pores 16 will now be described. The plurality of carbon nanotubes may comprise single wall carbon nanotubes having a length of ranging from approximately 50 microns to about 100 microns or more. Carbon nanotubes are structurally strong and will not degrade over time. Suitable nanotubes are available from various commercial sources, and may initially be sonicated utilizing deionized, distilled water and a 1% solution of a surfactant, such as sodium dodecyl sulfate. The carbon nanotubes will become trapped in the surfactant, which takes the form of a surfactant sleeve around the carbon of the nanotube and effectively separates the carbon nanotubes, which would otherwise tend to stick together because of strong van der Waals forces. The coated nanotubes may be collected by centrifugation and poured into a clean glass beaker. A glass slide may be suspended vertically in the final solution of cleaned and coated tubes. The beaker may be placed in a dust free environment, and the water in the solution will be allowed to evaporate. As the waterline lowers, a film will gradually deposit on the glass slides. This resulting film comprises length-aligned coated carbon nanotubes. The slides may then be rinsed to remove most of the surfactant, and dried through evaporation.

To form a matrix 15 that is impermeable to water molecules, a thermoplastic polymer compound such as polyvinyl chloride (PVC) resin may be combined with about 2% of precipitated calcium carbonate (PCC) of nanoscale grain size (mean size 40 nm). PVC is a long chain polymer with a planar configuration, which is self-miscible for both single run processing and for partial processing buildup. Precipitated calcium carbonate serves primarily as a strength material, but it is not required. A plasticizer, such as the chemical compound of 1,2-Cyclohexanedicarboxylic acid diisononyl ester and known as the commercially available product of Hexamoll® Dinch sold by the manufacturer BASF, may be mixed with the PVC resin. This particular compound is understood to be non-toxic to humans, and it is not phthalate-based. The mixture may be vacuum extruded to remove air bubbles. The resulting thermoplastic compound may be kept at room temperature until ready for use. Alternatively, the impermeable matrix 15 may be formed by selecting a ceramic material that has an acoustic impedance that is substantially matched to the acoustic impedance of transducing material 32, such as the electroactive material lead zirconate titanate (PZT).

To build and cure a polymer-nanotube assembly so as to form a microporous membrane, a borosilicate roller and a diamond knife may be used to shape and cut the polymer compound into thin strips, which may then be placed over the partially rinsed carbon nanotubes on the glass side. The roller may be rolled over the polymer compound to embed the nanotubes into the opposing surface of the polymer. The polymer compound matrix with the nanotubes therein may be placed on a second slide with the partially imbedded nanotubes facing away from the surface of the slide, and the remainder of the surfactants rinsed from the nanotubes. This process may be repeated to build up the polymer-nanotube assembly. Processing the plurality of thin strips in this manner and then combining them together through successive rolling, a layered microporous membrane may be formed. This membrane may be shaped into a wafer or disk approximately 4 mm in diameter. The wafer may then be fired in an oven set at 250° F. for a minimum of 30 minutes. Alternatively, each half-imbedded thin strip may be partially cured at 250 degrees Fahrenheit before rinsing the remainder of the surfactant, and the partially cured, rinsed and dried strips may be assembled together for the final curing process. Gelation and curing of the material improves with longer firing times. Once cured, a three-dimensional workpiece of a polymer-based, microporous membrane may be obtained.

To machine and assemble the polymer workpiece into final form as a microporous membrane, a lapping tool may be used to cut a thin section from the wafer as it is adhered to a lapping fixture with a mounting wax. The wafer may be lapped down to a thickness of approximately 40 microns (μ) utilizing a lapping cloth and a slurry of diamond nano crystals. This lapping process will shave off the tops of the carbon nanotubes and with the effect of opening the ends of the carbon nanotubes. The wafer may then be removed from the lapping fixture.

Once machined, the thin, wafer-like membrane 14 may be sandwiched between layers of raw thermoplastic polymer such as the PVC resin to form an integrated unit with the conduit 20. For instance, an upper conduit portion 20A and a lower conduit portion 20B are placed in position above and below, respectively, the membrane 14 such that conduit 20 is formed with an outer diameter of approximately 4 mm, while the exposed surface area of the thin wafer-like membrane 14 is approximately 1 mm in diameter. As shown in FIG. 1, the upper portion 20A is relatively thin, and the lower layer 20B is substantially thicker. One or more raw polymer layers may be provided, and the thickness of each layer may be altered for particular applications. The integrated assembly may be baked to cure the material.

Manufacture of the microporous membrane may also be accomplished by utilizing a selected gold or silver clay. In this embodiment, the carbon nanotubes are embedded in the clay and the matrix-nanotube assembly built up in the same manner as that of the polymer (PVC) manufacture embodiment. The metallic layer assembly may be baked in a kiln to a specified temperature for curing the clay. The binder cooks away and the metal coalesces and "shrinks" to encase the carbon nanotubes. This embodiment of manufacture may also use the same lapping process used for the polymer-based workpiece. The advantage of using gold and silver in the clay is that gold is impervious to harsh chemicals, and silver is a biocide.

As mentioned at the beginning of this description, the filtering apparatus discussed herein is scalable, and a bank of filters may be built and assembled inside the chassis of a large scale filtering assembly. The microporous membrane, when constructed with a water impermeable matrix and carbon nanotubes of particular size to form its pores, only permits water molecules to pass through the nanotubes, leaving contaminants such as alcohol or a virus behind.

While the filtering apparatus described herein has at least one embodiment particularly well suited for filtering contaminated water to produce purified, clean water, the filtering apparatus may also be used to remove various types of impurities, whether in liquid or solid form, from other liquids which are passed through the apparatus, so that the discharged fluid is substantially free of contaminants. A sizing range for the diameter of the carbon nanotubes or other material used to form pores within the microporous membrane would thus depend upon the substance or fluid which is filtered, so that the pores are sized to pass molecules that are clean or purified while preventing the passage of contaminants through the pores.

Similarly, the particular frequency at which the acutator propagates acoustic vibrations may need to be adjusted, depending upon the fluid or substance to be sifted and the desired degree of purity for the sifted substance or fluid. Accordingly, the filtering apparatus and the method as disclosed herein may be used to clean various types of substances or fluids.

Although only a few exemplary embodiments of this invention have been described in detail above, a skilled artisan will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for making a microporous membrane, comprising:
providing a plurality of carbon nanotubes, each carbon nanotube having a first end and an opposing second end and a hollow interior with a diameter of 20 Angstroms or less;
sonicating the plurality of carbon nanotubes utilizing a solution comprising deionized, distilled water and a surfactant that coats at least one of the plurality of carbon nanotubes;
collecting the coated carbon nanotubes;
embedding the coated carbon nanotubes into a matrix;
curing the nanotube-matrix assembly; and
cutting the nanotube-matrix assembly to a thickness so as to open the first end and the opposing second end of the embedded carbon nanotudes, wherein the hollow interior of the carbon nanotube comprises a pore of the microporous membrane and the microporous membrane is so configured as to enable movement of molecules therethrough.

2. A method for making a microporous membrane, comprising:
providing a plurality of carbon nanotubes, each carbon nanotube having a first end and an opposing second end and a hollow interior diameter of 20 Angstroms or less;
sonicating the plurality of carbon nanotubes utilizing a solution comprising deionized, distilled water and a surfactant that coats at least one of the plurality of carbon nanotubes;
collecting the coated carbon nanotubes;
embedding the coated carbon nanotubes into a matrix;
rinsing the coated nanotubes to remove at least a portion of the surfactant;
curing the nanotube-matrix assembly; and
cutting the nanotube-matrix assembly to a thickness so as to open the first end and the opposing second end of the embedded nanotubes, wherein the hollow interior of each carbon nanotube comprises a pore of the mieroporous membrane and the microporous membrane is so configured as to enable movement of molecules therethrough.

3. A method for making a microporous membrane, comprising:
providing a plurality of carbon nanotubes, each carbon nanotube having a first end and an opposing second end;
sonicating the plurality of carbon nanotubes utilizing a solution comprising deionized, distilled water and a 1% solution of a surfactant that coats at least one of the plurality of carbon nanotubes;
collecting the coated carbon nanotubes by centrifugation and evaporation of the solution;
forming a matrix that supports the plurality of carbon nanotubes;
cutting the matrix into a thin strip;
embedding the coated carbon nanotubes into the thin strip of the matrix;
rinsing the coated nanotubes to remove at least a portion of the surfactant;
curing the nanotube-matrix assembly; and
cutting the nanotube-matrix assembly to a thickness so as to open the first end and the opposing second end of the embedded nanotubes such that the microporous membrane is so configured as to enable movement of molecules therethrough.

4. The method of claim 3 wherein the plurality of carbon nanotubes each have a length ranging from about 50 microns to about 100 microns.

5. The method of claim 3 wherein the surfactant comprises sodium dodecyl sulfate.

6. The method of claim 3 wherein the surfactant comprises sodium lauryl sulfate.

7. The method of claim 3 wherein the surfactant comprises sodium laureth sulfate.

8. The method of claim 3 wherein the matrix is formed by mixing a thermoplastic polymer compound with a plasticizer.

9. The method of claim 8 wherein the plasticizer mixed with the thermoplastic polymer compound is the chemical compound of 1,2-Cyclohexanedicarboxylic acid diisononyl ester.

10. The method of claim 3 wherein the matrix is formed of lead zirconate titanate (PZT).

11. The method of claim 3 wherein the steps of cutting a thin strip, embedding the coated nanotuhes, and rinsing the embedded nanotuhes are repeated at least once to form a multilayer nanotube-matrix assembly.

12. The method of claim 11 further comprising the step of shaping the multilayer nanotube-matrix assembly into a disk approximately 4 mm in diameter.

13. The method of claim 3 wherein the step of curing the nanotube-matrix assembly comprises heating the nanotube-matrix assembly at 250° F. for a minimum of 30 minutes.

14. The method of claim 3 wherein the step of cutting the nanotube-matrix assembly is performed by using a lapping cloth and a slurry of diamond nano crystals.

15. The method of claim 3 wherein the plurality of carbon nanotubes have a hollow interior diameter ranging from about 5 to about 20 Angstroms.

16. The method of claim 3 wherein the plurality of carbon nanotubes have a hollow interior diameter ranging from about 8.1 to about 13.5 Angstroms.

17. The method of claim 3 wherein the step of sonicating is performed at 20 kHz.

18. The method of claim 3 wherein the thickness to which the membrane is cut is approximately 40 microns.

* * * * *